Sept. 26, 1967  N. B. WALES, JR  3,344,344
ELECTRIC CHARGE RESPONSIVE DEVICE
Filed Oct. 1, 1964  2 Sheets-Sheet 1
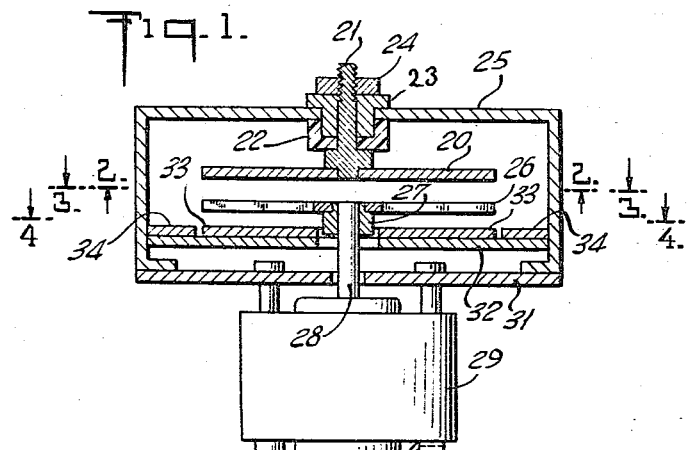
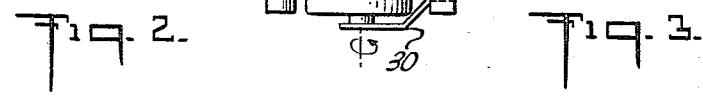
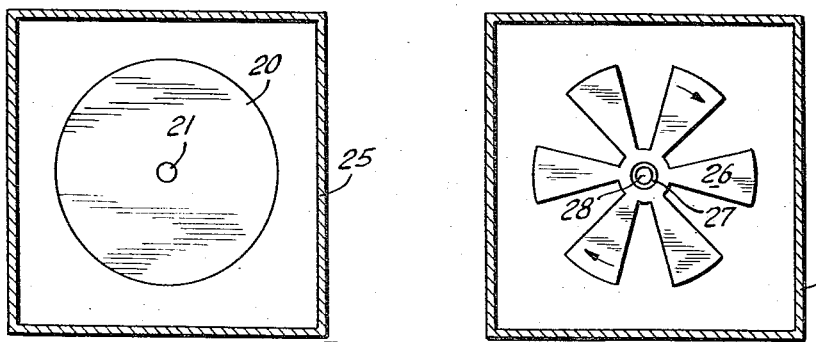
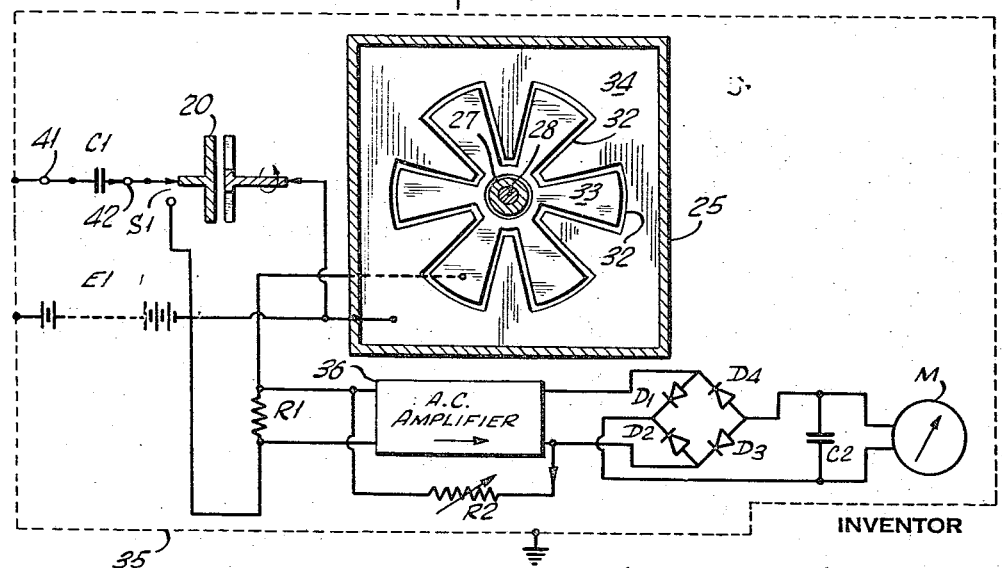
INVENTOR
Nathaniel B. Wales Jr

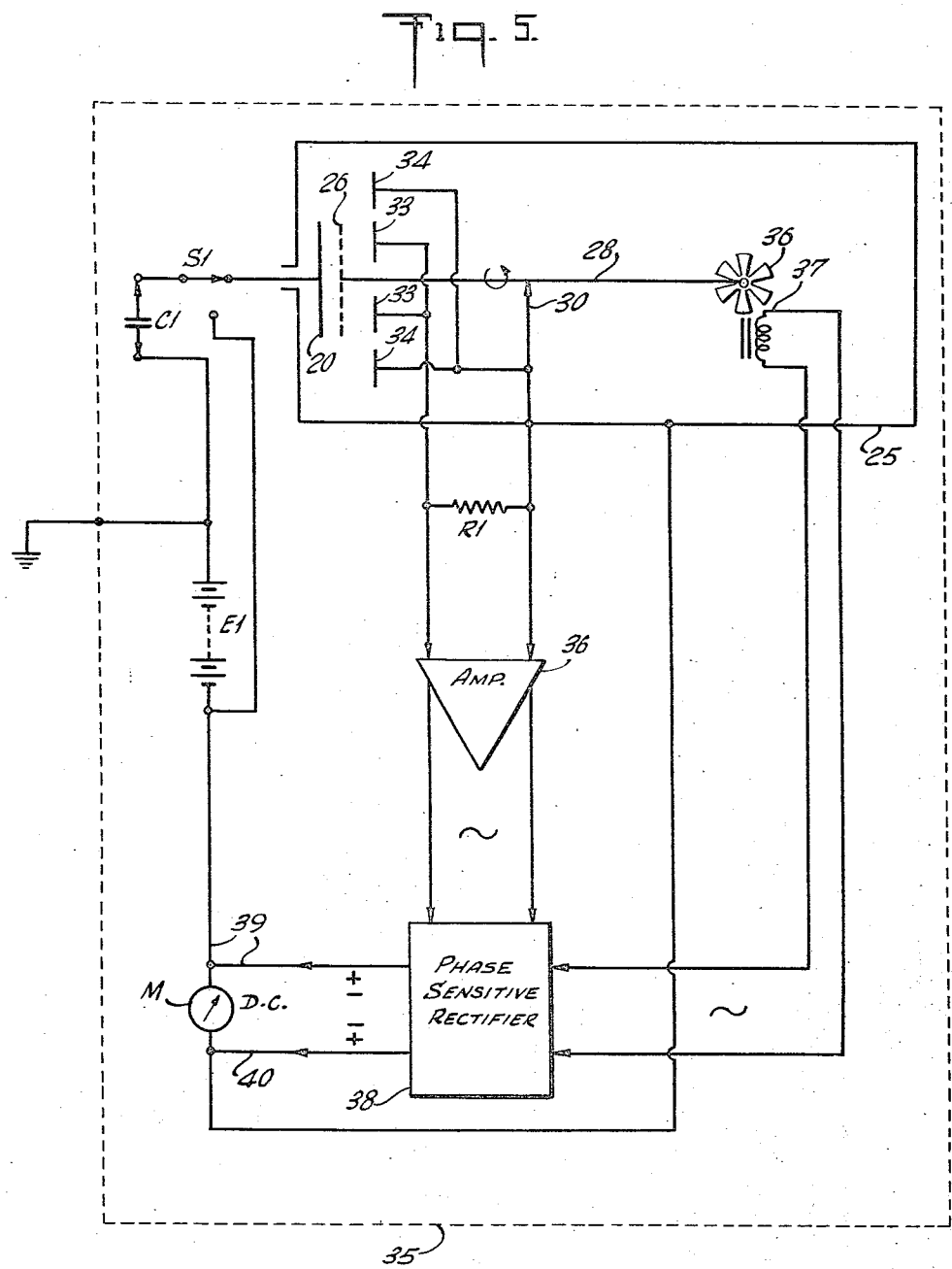

United States Patent Office

3,344,344
Patented Sept. 26, 1967

3,344,344
ELECTRIC CHARGE RESPONSIVE DEVICE
Nathaniel B. Wales, Jr., New York, N.Y.
(48 Park Lane, Fair Haven, N.J. 07701)
Filed Oct. 1, 1964, Ser. No. 400,864
4 Claims. (Cl. 324—32)

This invention relates to an instrument for accurately measuring small quantities of electric charge, such as the charge remaining on a radiation measuring ionization chamber. Because this instrument is responsive to very small charges, it may also be used as a substantially infinite impedance voltmeter, since it draws no current except insulation resistance leakage, once the small fixed capacity of its input electrode has been charged to the potential under measurement.

In the prior art of charge measurement, or high impedance potential measurement, the principal available tool has been apparatus using an electrometer tube. However, electrometer tube devices do draw a finite current and are subject to drifting of their measurements.

The present invention overcomes these limitations by providing a highly reproducible and drift-free operation.

The principle of the subject invention is similar to the principle of the "generating voltmeter" which uses a rotating electrostatic chopper vane to measure the free space electrostatic field intensity present in the vicinity of high voltage generators such as Van Der Graff machines, or in the measurement of meteorological cloud fields. This principle uses mechanical work supplied by a motor driving the rotating chopper vane, to generate by electric induction an alternating current in a load resistor connecting the chopping rotor to an induction electrode which is alternately exposed to and shielded from the electrostatic field to be measured by the rotor vanes. The foregoing alternating current is proportional to the intensity of the field and to the rate of chopping, and so can be conveniently amplified and indicated.

The present invention achieves its charge measuring utility by adding three important elements to the foregoing well known generating field meter. These elements are: first, the addition of a third floating input electrode on the opposite side of the chopper vane from the induction electrode so that the charge to be measured can be shared with the fixed distributed capacitance of this input electrode; second, the enclosure of the induction electrode, chopper rotor, and input electrode in a first electrostatic shield which is clamped to a fixed reference potential with respect to ground so that the induced currents will be a measure of the loss of charge in the measured source of charge away from this reference potential; and third, the provision of a fourth complementary transfer electrode in the same plane as the induction electrode and surrounding it in this plane so that the input capacitance will remain substantially constant instead of being cyclically modulated as would be the case in the absence of this fourth transfer electrode.

The foregoing novel electrode geometry makes possible an additional feature of the invention whereby a self-balancing potentiometric servo circuit generates a bucking potential exactly equal to the potential of the source of charge being measured. In this way, the charge of an ionization chamber, for instance, may be read without any permanent sharing of charge, thereby leaving the chamber in exactly the same electrical charge condition after the reading as it had before.

The principal object of this invention is to provide a nearly infinite impedance device which will measure electrical charges and potentials without drawing appreciable current, and without appreciable drift.

Another object of the invention is to provide an instrument for measuring the voltage of a capacitor without altering this voltage.

Still another object of the invention is to provide a geometry of generating voltmeter which will present a substantially constant capacitance to its input.

A further object of the invention is to provide a stable and drift free instrument for directly indicating the potential loss due to radiation of an ionization chamber which had been previously charged to a known reference potential.

For other objects and a clearer understanding of the present invention, reference may be had to the following detailed specifications to be taken in conjunction with the accompanying drawings, in which:

FIGURE 1 is a central sectional view in elevation of the preferred mechanical form of the invention;

FIGURE 2 is an upward view through plane 2—2 of FIGURE 1;

FIGURE 3 is a plan view through plane 3—3 of FIGURE 1;

FIGURE 4 is a plan view through plane 4—4 of FIGURE 1 together with a schematic wiring diagram of the preferred form of the entire invention; and FIGURE 5 is the schematic diagram of an alternative form of the invention utilizing a servo circuit to buck out the measured potential.

Referring to FIGS. 1 through 4, 20 is a metal disk which forms the input electrode. Disk 20 is secured to a metal stud 21 threaded at its outer end to receive a nut 24, by means of which insulating bushings 22 and 23 are clamped to a metal shielding box 25 thereby securing electrode 20 to and insulating it from shield 25 in spaced relation.

Shield box 25 is provided with a metal cover plate 31 to which a synchronous electric motor 29 having a shaft 28 is secured. The rear outer end of shaft 28 is provided with a spring leaf 30 which serves to electrically connect shaft 28 to the shield case 25.

A metal chopping disk rotor 26 is secured to shaft 28 by means of a hub 27. Rotor disk 26 is formed so as to have an evenly spaced plurality of radial vanes, which preferably have an area equal to the area of the spaces between them.

On the far side of chopper disk 26 from the parallel input disk 20, an electrode supporting insulating plate 32 is secured to box 25 so as to form a plane parallel to both disks 20 and 26 and in spaced relation below both. A central hole in plate 32 provides non-contacting access through which shaft 28 and hub 27 may pass.

Insulating plate 32 has cemented to it two metal film coplanar electrodes 33 and 34 which have the intermeshing coplementary non-contacting pattern shown in FIG. 4. This pattern may conveniently be formed by photo-etching techniques.

Electrode 33 is the induction electrode, and its shape is congruent with the shape of the shielding vanes of chopper disk 26. Electrode 34 is the transfer electrode or electrical guarding electrode, and it lies in the same plane with and surrounds induction electrode 33 without electrically contacting it due to the space provided between them. Electrode 34 is electrically connected to the shield case 25.

It may be seen in FIGS. 1 and 4 that if an electric charge is placed on input electrode 20, electrostatic lines of force will radiate therefrom to terminate either on the inside surface of box 25, or on chopper disk 26, or on induction electrode 33, or on guard electrode 34. When the angular position of the chopper vanes 26 is such as to coincide with the induction electrode 33, the latter will be shielded from the lines of electrostatic force emanating from input disk 20, and substantially all the lines will terminate on the isopotential surfaces 25, 26, and 34.

However, when the shielding vanes of disk 26 are out of phase registration with induction electrode 33, a substantial number of lines of force will terminate on 33. If a load resistor R1 is now connected between the shielding electrodes 25, 26, 34, and the induction electrode 33, it will take mechanical work to transfer the electrostatic lines of force alternately onto and away from induction electrode 33. This mechanical work which is supplied by motor 29 is transformed into electrical energy which is dissipated as heat in resistor R1.

As a consequence, although none of the energy stored in electric charge deposited on disk 20 is dissipated (except through the resistive leakage of bushings 22 and 23), nevertheless, an alternating voltage will appear across load resistor R1, which may be used, after amplification and rectification, to measure the magnitude of charge deposited on electrode 20.

If the complementary guard electrode 34 is removed, currents proportional to the charge on input disk electrode 20 will still be generated, but there will be a cyclic variation of the distributed capacity of disk 20 with a consequent modulation of the potential of disk 20. In many applications, this variation is highly objectionable (for instance, in the circuit of FIG. 5), and the novel provision of the constant capacity transfer electrode 34 which this invention teaches, constitutes a very useful improvement.

Referring now to the schematic system of FIG. 4, the alternating voltage appearing across load resistor R1 due to the presence of a charge on input electrode 20 is amplified in the alternating current amplifier 36, then rectified in the full wave bridge of diodes D1, D2, D3, and D4, after which it is filtered in capacitor C2 and displayed as a direct current reading in a meter M.

Amplifier 36 is provided with an adjustable negative feedback resistor R2 to stabilize its gain at a predetermined level for calibration purposes.

The circuit of FIG. 4 has been drawn to illustrate a specific application of this invention's principle, namely, the application of reading the loss of potential experienced by a radiation dosimeter ionization chamber due to its exposure to irradiation from an X-ray or radioactive source.

Such chambers are, electrically, simply a small capacitance (say 5.0 picofarads) shunted by a small air chamber having two electrodes connected to this capacitor. Before exposure to the irradiation, the chamber is charged to a predetermined potential (say 500 volts), and after irradiation the drop in potential from 500 volts may be directly calibrated in units of radiation such as roentgens.

The foregoing ionization chamber capacitance is represented in FIG. 4 by C1 which may be separably connected between a terminal 41 which is grounded to a shield 35 surrounding the entire apparatus, and a terminal 42 connected to the arm of a SPDT switch S1. In the position shown, S1 is in the reading position in which C1 is connected to input electrode 20, resulting in a sharing of whatever charge there was on C1 with the distributed capacitance of electrode 20. A source of fixed reference potential E1 is provided and connected between the grounded shield 35 and the chopper potential on electrodes 34, 25, and 26. When switch S1 is thrown to the opposite position to that shown in FIG. 4, the ionization chamber capacitance C1 is charged to the potential E1. If switch S1 is then moved to the reading position meter M will register zero because there is no potential difference between input electrode 20 and induction electrode 33. If ionization chamber C1 is now removed and subjected to irradiation, a portion of its charge will be dissipated in proportion to the amount of radiation experienced. After this loss of charge, if chamber C1 is reconnected via switch S1 to the input electrode 20, there will be a sharing of charge between C1 and the distributed capacitance of input electrode 20. Since the fixed distributed capacitance of electrode 20 is known, the meter M may be calibrated, for a given gain setting of R2, in terms of roentgens or other units of radiation, because the difference in potential between 20 and 33 will then be a measure of the drop in potential of C1 from its initial value of E1.

Referring now to the circuit of FIG. 5 all of the elements 25, 20, 26, 33, 34, 30, 39, 38, 35, R1, C1, S1, E1 and 36 are identical with and have the same functions as the corresponding elements of FIG. 4. However, there has been added a magnetic generating rotor 36 to the motor shaft 28. This rotor 36 has a number of magnetized lobes corresponding to the vanes of choper electrode 26 and having the same phase so that as shaft 28 rotates a voltage signal will be generated in a cooperating magnetic stator coil 37 which gives electrical information as to when electrode 33 is being shielded by vanes 26 and as to when vanes 26 are moving so as to expose electrode 33 to the charge on input electrode 20.

This phase information together with the output of amplifier 36 are combined in a phase sensitive detector 38, such as is known to those skilled in the art, so that the output of detector 38 is a direct current voltage proportional to the AC voltage across R1 and having a polarity dependent on the polarity of the charge on input electrode 20. This output is impressed on meter M by leads 39 and 40 which also connect this voltage in a series bucking relation between reference potential E1 and the chopping potential 25, 34, 30, 26.

The foregoing system comprises a servo loop which tends to adjust the potential between leads 39 and 40 until there is no potential difference between input electrode 20 and the chopping potential of case 25.

Consequently, any initial transfer of charge from C1 to electrode 20 thereby generating an error signal as output of amplifier 36, will be restored as soon as the output of rectifier 38 impresses the corrective bucking potential between E1 and chopping potential 26. Furthermore, the value of the potential to which C1 was charged before connection to 20 will be read on meter M because this is the potential necessary to bring electrode 33 to the same potential as electrode 20.

Evidently, after reading this value of the potential of C1 on meter M of FIGURE 5, C1 may be removed without having its original charge changed.

As many variations will occur to those skilled in the art within the scope of this invention, it is understood that this scope is defined in the following claims.

What is claimed is:

1. A charge responsive device comprising: An electrostatic induction electrode; an input electrode spaced and insulated from said induction electrode; a first shield cage substantially surrounding and insulated from both said induction electrode and said input electrode; a shielding vane electrically connected to said first shield cage; mechanical means alternately to insert and to withdraw said vane into shielding relation between said input electrode and said induction electrode; a load impedance connecting said vane and said induction electrode; and amplifying means to measure the current flowing in said load impedance.

2. In a device in accordance with claim 1: A second shield cage substantially surrounding said first shield cage; a first input terminal connected to said second cage; a second input terminal connected to said input electrode; a source of reference potential; and circuit means connecting said reference potential between said first cage and said second cage whereby said amplifying means will measure the difference between said reference potential and any potential impressed between said first and second imput terminals.

3. In a device in accordance with claim 1: A transfer guard electrode electrically connected to said first cage having a shape and position such that the capacitance between said vane and said induction electrode when said vane is in its inserted position is substantially equal to the capacitance which would exist between said vane and said guard electrode when said vane is in its withdrawn position if said vane and said guard electrode were not electrically connected.

4. A servo system comprising: An electrostatic induction electrode; an input electrode spaced and insulated from said induction electrode; a first shield cage substantially surrounding and insulated from both said induction electrode and said input electrode; a shielding vane electrically connected to said first shield cage; mechanical means alternately to insert and to withdraw said vane into shielding relation between said input electrode and said induction electrode; a load impedance connecting said vane and said induction electrode; an amplifier having as its input the voltages appearing across said load impedance; rectifying means for converting the alternating current output of said amplifier into a direct current error voltage; phase sensitive means for controlling the polarity of said error voltage in response to the phase relation between said vane motion and the resultant voltages appearing across said load impedance; a voltmeter for measuring said error voltage; a first input terminal connected to said input electrode; a second input terminal; and circuit means for impressing said error voltage between said first cage and said second input terminal whereby readings linearly related to potentials impressed between said first and second input terminals will be displayed on said voltmeter.

References Cited

UNITED STATES PATENTS

| | | | |
|---|---|---|---|
| 2,032,932 | 3/1936 | Hauffe et al. | 324—109 |
| 2,587,156 | 2/1952 | Havenhill et al. | 324—72 |
| 2,820,947 | 1/1958 | Gunn | 324—32 XR |
| 2,980,855 | 4/1961 | Moore | 324—32 X |
| 3,253,207 | 5/1966 | Jauch | 324—72 X |

RUDOLPH V. ROLINEC, *Primary Examiner.*

C. F. ROBERTS, *Assistant Examiner.*